US010783023B2

(12) United States Patent
Tokai et al.

(10) Patent No.: US 10,783,023 B2
(45) Date of Patent: Sep. 22, 2020

(54) RECORDING CONTROL DEVICE, RECORDING CONTROL METHOD, RECORDING TAPE CARTRIDGE

(71) Applicant: FUJIFILM CORPORATION, Minato-ku, Tokyo (JP)

(72) Inventors: Naoaki Tokai, Kanagawa (JP); Hirokazu Hashimoto, Kanagawa (JP); Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 149 days.

(21) Appl. No.: 16/120,329

(22) Filed: Sep. 3, 2018

(65) Prior Publication Data
US 2019/0073252 A1 Mar. 7, 2019

(30) Foreign Application Priority Data

Sep. 4, 2017 (JP) ................................. 2017-169386

(51) Int. Cl.
*G06F 11/00* (2006.01)
*G06F 11/07* (2006.01)
(Continued)

(52) U.S. Cl.
CPC .......... *G06F 11/076* (2013.01); *G06F 3/0616* (2013.01); *G06F 3/0619* (2013.01);
(Continued)

(58) Field of Classification Search
CPC .... G06F 11/076; G06F 3/0616; G06F 3/0682; G06F 11/008
See application file for complete search history.

(56) References Cited

U.S. PATENT DOCUMENTS

| 8,601,313 B1* | 12/2013 | Horn ................... G06F 11/3034 |
| | | 714/6.32 |
| 2006/0103961 A1* | 5/2006 | Sugawara .............. G11B 20/18 |
| | | 360/31 |

(Continued)

FOREIGN PATENT DOCUMENTS

| JP | S56-093119 A | 7/1981 |
| JP | H03-203832 A | 9/1991 |

(Continued)

OTHER PUBLICATIONS

English language translation of the following: Office action dated Dec. 3, 2019 from the JPO in a Japanese patent application No. 2017-169386 corresponding to the instant patent application. This office action translation is submitted now in order to supplement the understanding of the cited references which are bieng disclosed in the instant Informaion Disclosure Statement.

*Primary Examiner* — Charles Ehne
(74) *Attorney, Agent, or Firm* — Solaris Intellectual Property Group, PLLC

(57) ABSTRACT

A recording control device, a recording control method, and a recording tape cartridge capable of estimating a lifetime of the recording tape cartridge are obtained. A recording control device reads information correlated with an error rate of reading or writing of data from or to a magnetic tape included in a recording tape cartridge, the information being recorded on a RFID tag included in the recording tape cartridge, and a measurement date of the information, and estimates a lifetime of the recording tape cartridge using the read information and the read measurement date, and the information measured at the time of using the recording tape cartridge and a measurement date.

7 Claims, 4 Drawing Sheets

(51) Int. Cl.
  *G11B 5/008* (2006.01)
  *G06F 3/06* (2006.01)
  *G11B 23/107* (2006.01)
  *G11B 23/02* (2006.01)
  *G11B 23/04* (2006.01)
  *G06K 19/07* (2006.01)

(52) U.S. Cl.
  CPC .......... *G06F 3/0653* (2013.01); *G06F 3/0659* (2013.01); *G06F 3/0682* (2013.01); *G06F 11/008* (2013.01); *G06F 11/073* (2013.01); *G11B 5/00813* (2013.01); *G11B 23/021* (2013.01); *G11B 23/042* (2013.01); *G11B 23/107* (2013.01); *G06K 19/0723* (2013.01)

(56) References Cited

U.S. PATENT DOCUMENTS

2010/0083203 A1* 4/2010 Bose .................... G06F 30/367
                                                              716/113
2012/0305692 A1 12/2012 Suzuki et al.

FOREIGN PATENT DOCUMENTS

| | | |
|---|---|---|
| JP | H103-203834 A | 9/1991 |
| JP | 2000-076020 A | 3/2000 |
| JP | 2000-100151 A | 4/2000 |
| JP | 2000-235774 A | 8/2000 |
| JP | 2012-150866 A | 8/2012 |
| JP | 2012-252744 A | 12/2012 |

\* cited by examiner

RECORDING CONTROL DEVICE, RECORDING CONTROL METHOD, RECORDING TAPE CARTRIDGE

CROSS-REFERENCE TO RELATED APPLICATION

This application claims priority under 35 USC 119 from Japanese Patent Application No. 2017-169386 filed on Sep. 4, 2017, the disclosure of which is incorporated by reference herein in its entirety.

BACKGROUND OF THE INVENTION

1. Field of the Invention

The present disclosure relates to a recording control device, a recording control method, and a recording tape cartridge.

2. Description of the Related Art

In the related art, a technology for generating predetermined error information in a case where an error occurs in a tape drive that performs recording or reproducing on a magnetic tape accommodated in a tape cassette has been proposed (see JP2000-235774A). In this technology, the generated error information is stored in a memory in which management information of a tape cassette is stored.

Further, a technology for performing a deterioration determination of a magnetic tape using tape type information of a tape cassette in which the magnetic tape is accommodated and information on times of use has been proposed (see JP2000-100151A).

Further, an optical recording medium in which date information with which lifetime inspection and maintenance should be performed is recorded in a part of a recording area or a non-recording area has been proposed (see JP1991-203834 (JP-H03-203834)).

In addition, an information recording medium having a recording area to which lifetime detection information for detecting a lifetime is written has been proposed (see JP1991-203832 (JP-H03-203832)).

SUMMARY OF THE INVENTION

Incidentally, reading or writing of data from or to the magnetic tape included in the recording tape cartridge is highly likely to fail due to a change in state due to aging as time elapses. In this regard, in a case where the lifetime of the recording tape cartridge can be estimated, a countermeasure such as replacement of the recording tape cartridge of which estimated lifetime is comparatively short or the lifetime has been exceeded can be preferably performed.

As a result of this countermeasure, it is possible to prevent occurrence of failure in reading or writing data from or to the magnetic tape included in the recording tape cartridge.

However, in the technologies described in JP2000-235774A, JP2000-100151A, JP1991-203834 (JP-H03-203834), and JP1991-203832 (JP-H03-203832), estimation of the lifetime of the recording tape cartridge is not taken into consideration.

The present disclosure has been made in view of the above circumstances, and an object of present disclosure is to provide a recording control device, a recording control method, and a recording tape cartridge capable of estimating a lifetime of the recording tape cartridge.

In order to achieve the above object, a recording control device of the present disclosure comprises a reading unit that reads information correlated with an error rate of reading or writing of data from or to a magnetic tape included in a recording tape cartridge, the information being recorded on a recording medium included in the recording tape cartridge, and a measurement date of the information; and an estimation unit that estimates a lifetime of the recording tape cartridge using the information and the measurement date read by the reading unit, and the information measured at the time of using the recording tape cartridge and a measurement date.

In the recording control device of the present disclosure, a degree of change with elapse of time in the information in a case where the recording tape cartridge is stored in an environment at a predetermined environmental temperature may be further recorded on the recording medium, the reading unit may further read the degree of change, and the estimation unit may further estimate an environmental temperature of an environment in which the recording tape cartridge is stored at a current point in time using a degree of change with elapse of time in the information, calculated using the information and the measurement date read by the reading unit and the information measured at the time of using the recording tape cartridge and the measurement date, and the degree of change read by the reading unit.

Further, in the recording control device of the present disclosure, the information measured in a process of manufacturing the recording tape cartridge and a measurement date may be recorded on the recording medium.

Further, in the recording control device of the present disclosure, the estimation unit may estimate the lifetime of the recording tape cartridge using the information measured at the time of using the recording tape cartridge a plurality of times within a predetermined period backward from a current point in time, and the measurement date.

Further, in the recording control device of the present disclosure, the information correlated with the error rate may be a signal level in a case where a servo signal recorded on the magnetic tape is read.

Further, in the recording control device of the present disclosure, recording medium may be an RFID tag.

Meanwhile, in order to achieve the above object, a recording control method of the present disclosure comprises reading information correlated with an error rate of reading or writing of data from or to a magnetic tape included in a recording tape cartridge recorded on a recording medium included in the recording tape cartridge, and a measurement date of the information; and estimating a lifetime of the recording tape cartridge using the read information and the read measurement date, and the information measured at the time of using the recording tape cartridge and a measurement date.

Further, in order to achieve the above object, a recording tape cartridge of the present disclosure comprises a recording medium; and a magnetic tape, wherein information correlated with an error rate of reading or writing of data from or to the magnetic tape and a measurement date of the information are recorded on the recording medium.

According to the present disclosure, it is possible to estimate the lifetime of the recording tape cartridge.

DESCRIPTION OF THE PREFERRED EMBODIMENTS

Hereinafter, embodiments of the present disclosure will be described in detail with reference to the drawings.

Figure 1:
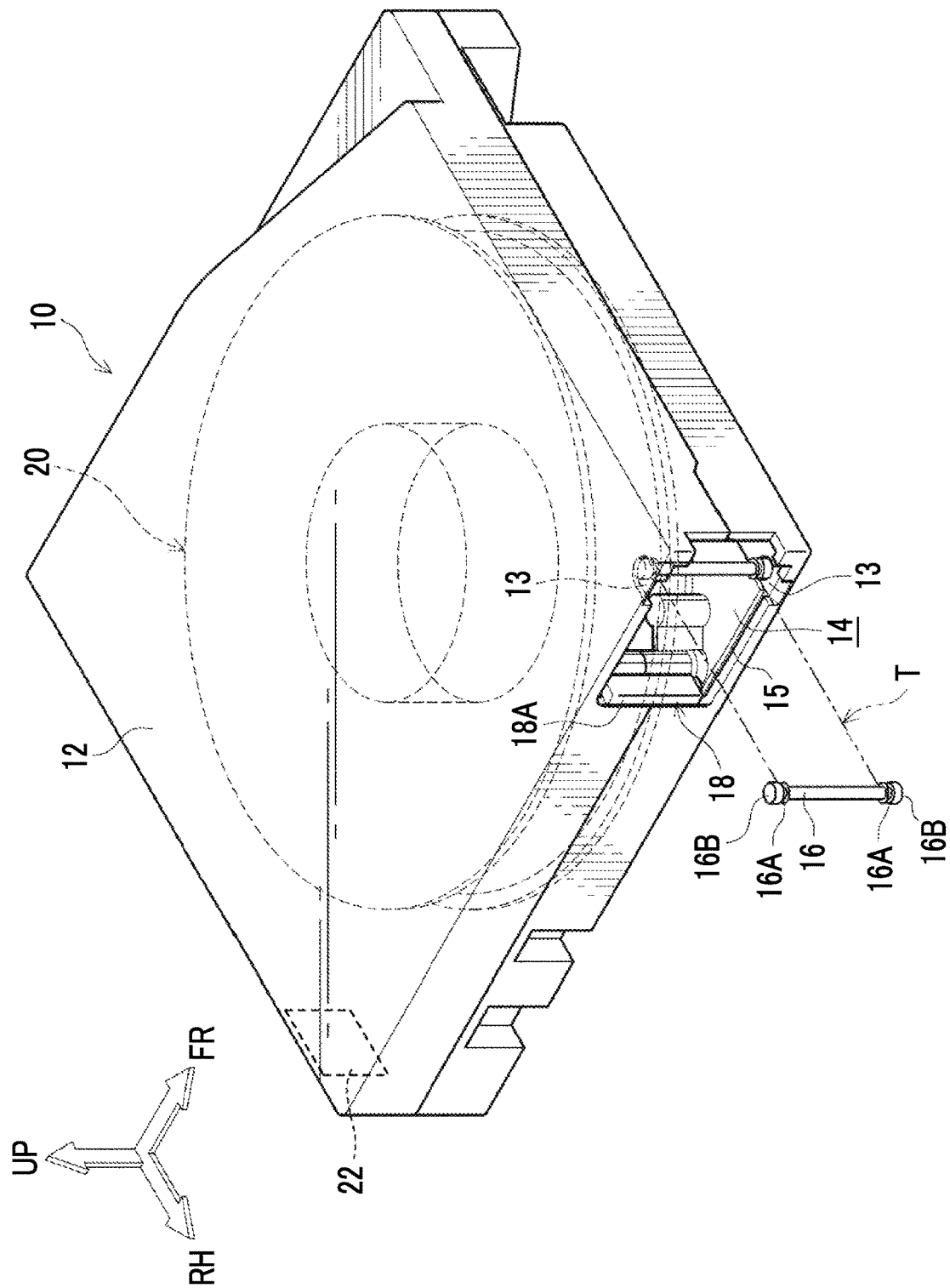
FIG. 1 is a perspective view illustrating an example of a recording tape cartridge according to an embodiment.

First, referring to FIG. 1, a configuration of a recording tape cartridge 10 according to the embodiment will be described. In FIG. 1, for convenience of description, a loading direction of the recording tape cartridge 10 to a tape drive 38 (see FIG. 2) is indicated by an arrow FR. Further, hereinafter, the direction indicated by the arrow FR is set as a front direction (a front side) of the recording tape cartridge 10. Further, hereinafter, a direction indicated by an arrow RH orthogonal to the arrow FR is set as a right direction (a right side) of the recording tape cartridge 10, and a direction indicated by an arrow UP orthogonal to the arrow FR and the arrow RH is set as an upward direction (an upper side) of the recording tape cartridge 10.

As illustrated in FIG. 1, the recording tape cartridge 10 according to the embodiment includes a case 12 formed of a resin material such as polycarbonate (PC) in a substantially rectangular box shape. Inside the case 12, a resin-made reel 20 around which a recording tape T such as a magnetic tape as an information recording and reproducing medium is wound and mounted is rotatably accommodated.

Further, the recording tape T according to the embodiment includes a data track on which data is recorded, and a servo track on which a servo signal to be used for positioning of a recording element that performs reading or writing of data from or to the data track is recorded. That is, in a case where the recording tape cartridge 10 according to the embodiment is used, positioning of the recording element is performed using a scheme called a timing-based servo scheme.

An opening 14 for pulling out the recording tape T is formed in a front portion of a right wall of the case 12. A leader pin 16 as a leader member that is pulled out while being locked by a pullout member (not illustrated) of the tape drive 38 is fixed to a free end portion of the recording tape T pulled out from the opening 14. An annular groove 16A is formed on both axial sides of the leader pin 16, and the annular groove 16A is locked to a hook of the pullout member or the like.

Further, a pair of upper and lower pin holding portions 13 for positioning and holding the leader pin 16 in the case 12 is formed inside the opening 14 of the case 12. The pin holding portion 13 is formed in a substantially semicircular shape with the side from which the recording tape T is pulled out being open, and both axial end portions 16B of the leader pin 16 in an upright state can enter or exit from the open side of the pin holding portion 13 to the inside of the pin holding portion 13.

Further, the opening 14 of the case 12 is opened and closed by a door 18. The door 18 is formed in a substantially rectangular plate shape having a size capable of closing the opening 14. A groove 15 into which upper and lower end portions of the door 18 are slidably inserted is formed inside the opening 14 such that the door 18 can move along the right wall of the case 12.

Further, a convex portion 18A for an opening and closing operation protrudes rightward at a front end portion of the door 18. The convex portion 18A is engaged with an engaging member (not illustrated) of the tape drive 38 according to loading of the recording tape cartridge 10 into the tape drive 38, such that the door 18 is opened.

Further, a Radio Frequency Identifier (RFID) tag 22 as an example of a recording medium from which recorded information can be read without contact through radio communication or the like is built into the case 12. Note that, although FIG. 1 illustrates an example in which the RFID tag 22 is disposed at a right rear portion in the case 12, a disposing position of the RFID tag 22 in the case 12 is not particularly limited. The disposing position of the RFID tag 22 in the case 12 may be, for example, a position at which information can be read without contact from the RFID tag 22 by a reading unit 40 to be described below.

Further, the RFID tag 22 according to the embodiment is an RFID tag using a scheme for transmitting recorded information to a reading device according to radio waves transmitted by a reading device such as an RFID reader (so-called passive method).

In addition, information correlated with an error rate of reading or writing of data from or to the recording tape T of the recording tape cartridge 10 (hereinafter simply referred to as "error rate") is recorded on the RFID tag 22 according to the embodiment. In the embodiment, as the information correlated with the error rate, a signal level in a case where the servo signal recorded on the servo track of the recording tape T has been read, which is measured in the process of manufacturing the recording tape cartridge 10, is stored in the RFID tag 22. It should be noted that as the signal level of this servo signal (hereinafter simply referred to as a "signal level") decreases, accuracy of positioning of the recording element described above decreases, resulting in an increase in error rate.

Further, a measurement date of the signal level (hereinafter simply referred to as a "measurement date") is further recorded on the RFID tag 22 according to the embodiment. Further, a degree of change of the signal level with elapse of time (hereinafter simply referred to as a "degree of change") in a case where the recording tape cartridge 10 is stored in an environment of a predetermined environmental temperature T1 is further recorded on the RFID tag 22 according to the embodiment. It should be noted that in the embodiment, a temperature (for example, 20° C.) suitable for the storage of the recording tape cartridge 10 determined according to a specification of the recording tape cartridge 10 is applied as the predetermined environmental temperature T1.

Figure 2:
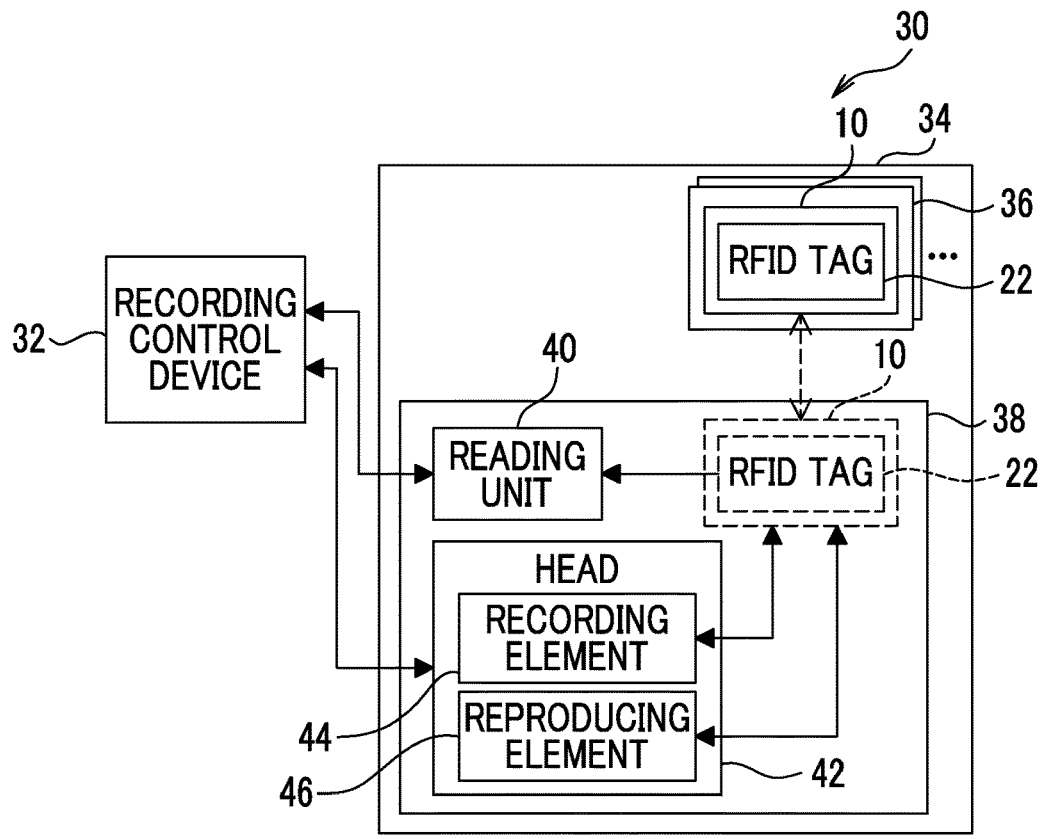
FIG. 2 is a block diagram illustrating an example of a configuration of a recording system according to the embodiment.

Next, a configuration of a recording system 30 according to the embodiment will be described with reference to FIG. 2. As illustrated in FIG. 2, the recording system 30 includes a recording control device 32 and a tape library 34.

The tape library 34 according to the embodiment includes a plurality of slots 36 and a tape drive 38. The recording tape cartridge 10 is stored in the slot 36. In a case where reading or writing of data from or to the recording tape T of the recording tape cartridge 10 is performed, the recording tape cartridge 10 is taken out of the slot 36 by a moving mechanism (not illustrated). The taken-out recording tape cartridge 10 is loaded onto the tape drive 38 by the moving mechanism.

Further, after reading or writing of data from or to the recording tape T of the recording tape cartridge 10 loaded into the tape drive 38 ends, the recording tape cartridge 10 is unloaded from the tape drive 38. The unloaded recording tape cartridge 10 is stored in the slot 36 by the moving mechanism.

Further, the reading unit 40 and a head 42 are embedded in the tape drive 38 according to the embodiment. The recording control device 32 and each of the reading unit 40 and the head 42 are connected such that the recording control device 32 and each of the reading unit 40 and the head 42 can communicate with each other. An example of the recording control device 32 includes an information processing device such as a personal computer and a server computer.

The reading unit 40 according to the embodiment reads the signal level, the measurement date, and the degree of change recorded on the RFID tag 22 built in the recording tape cartridge 10 in a noncontact manner under the control of the recording control device 32. The reading unit 40 outputs the read signal level, the measurement date, and the degree of change to the recording control device 32. Specifically, the reading unit 40 transmits radio waves to the RFID tag 22 under the control of the recording control device 32. In a case where the RFID tag 22 receives the radio waves transmitted from the reading unit 40, the RFID tag 22 transmits the signal level, the measurement date, and the degree of change recorded on the RFID tag 22 to the reading unit 40. The reading unit 40 receives the signal level, the measurement date, and the degree of change transmitted from the RFID tag 22, and outputs the received signal level, measurement date, and degree of change to the recording control device 32. An example of the reading unit 40 is an RFID reader.

The head 42 according to the embodiment includes a recording element 44 that performs reading or writing of data from or to the data track of the recording tape T, and a reproducing element 46 that reads the servo signal recorded on the servo track of the recording tape T. In a case where reading or writing of data from or to the recording tape T is performed, the tape drive 38 causes the reproducing element 46 to read the servo signal recorded on the servo track of the recording tape T. The tape drive 38 moves the head 42 in a width direction of the recording tape T according to a reading result of the reproducing element 46 to perform positioning of the recording element 44. Further, in this case, the reproducing element 46 measures the signal level of the read servo signal, and outputs the measured signal level to the recording control device 32.

Figure 3:
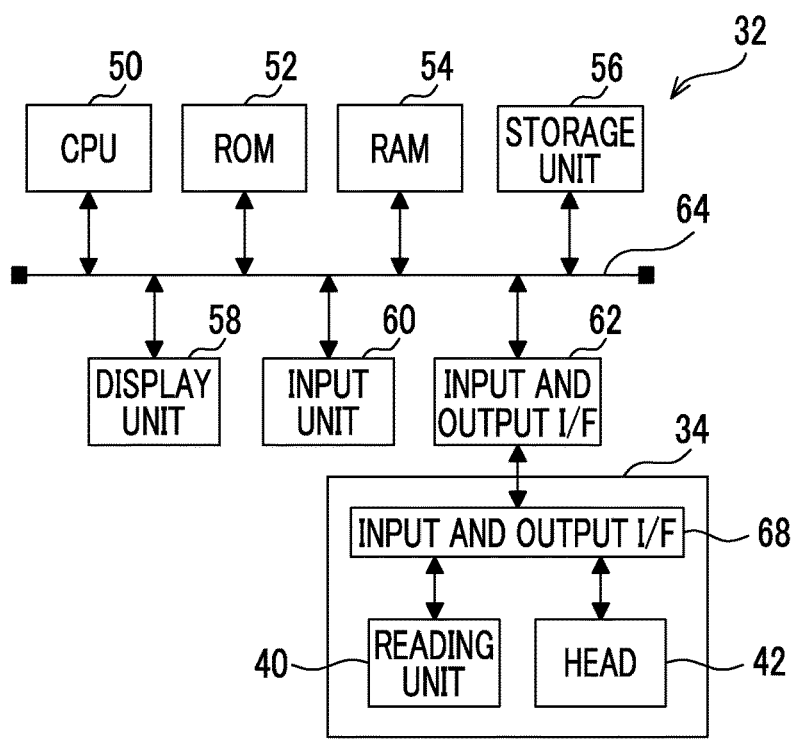
FIG. 3 is a block diagram illustrating an example of a configuration of main units of an electrical system of a recording control device according to the embodiment.

Next, a main configuration of the electrical system of the recording control device 32 according to the embodiment will be described with reference to FIG. 3. As illustrated in FIG. 3, the recording control device 32 includes a central processing unit (CPU) 50, and a read only memory (ROM) 52 in which various programs and various parameters are stored in advance. Further, the recording control device 32 includes a random access memory (RAM) 54 that is used as a work area or the like at the time of executing various programs in the CPU 50, and a nonvolatile storage unit 56 such as a hard disk drive (HDD).

Further, the recording control device 32 includes a display unit 58 such as a liquid crystal display, an input unit 60 such as a keyboard and a mouse, and an input and output interface (I/F) 62. The CPU 50, ROM 52, the RAM 54, the storage unit 56, the display unit 58, the input unit 60, and the input and output I/F 62 are connected to each other via a bus 64.

The input and output I/F 62 of the recording control device 32 is connected to an input and output I/F 68 of the tape library 34. The reading unit 40 and the head 42 are connected to the input and output I/F 68 of the tape library 34. With the above configuration, the CPU 50 can control the reading unit 40 and the head 42 via the input and output I/F 62 and the input and output I/F 68.

Figure 4:
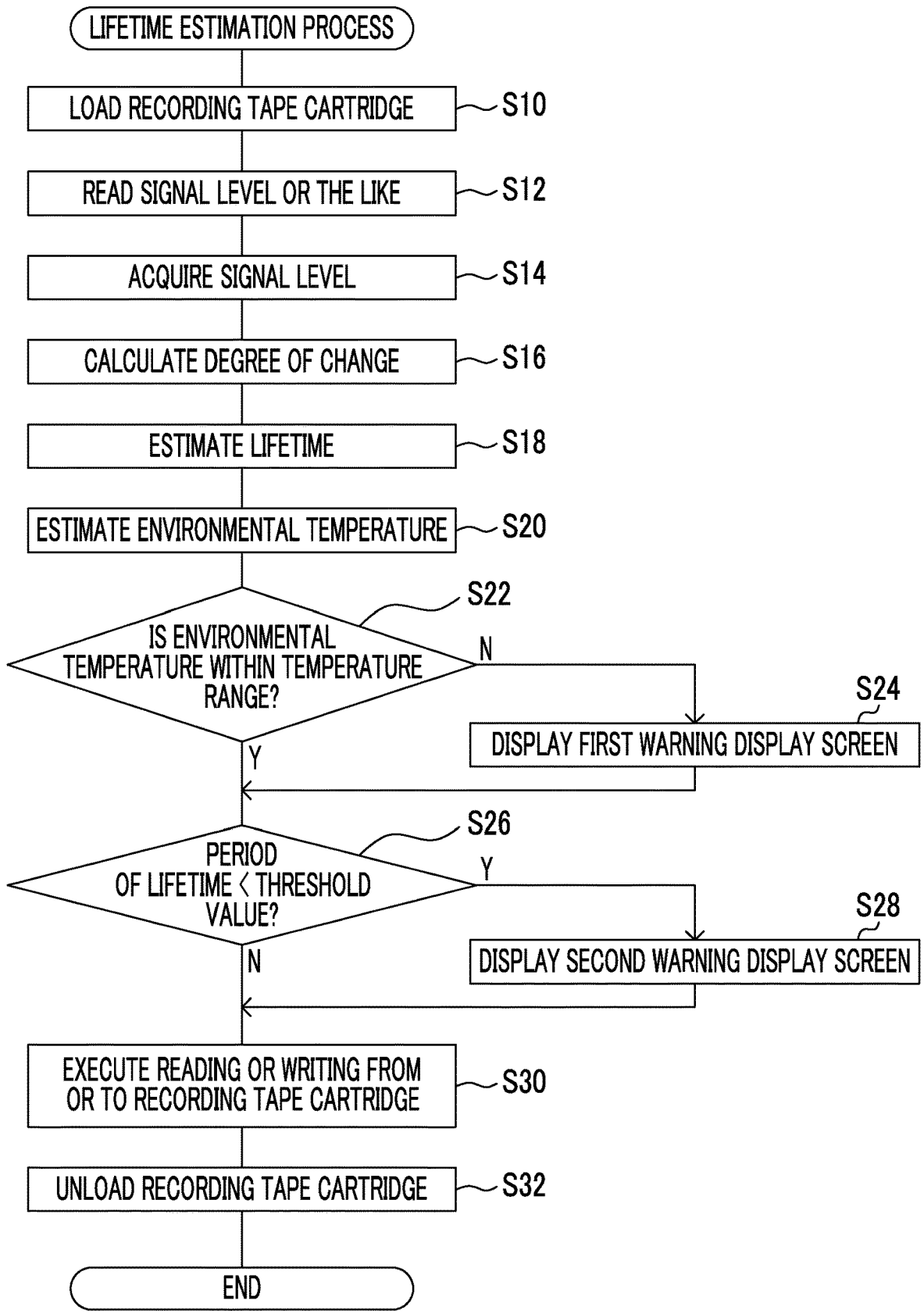
FIG. 4 is a flowchart illustrating an example of a lifetime estimation process according to the embodiment.

Next, an operation of the recording system 30 according to the embodiment will be described with reference to FIG. 4. A lifetime estimation process illustrated in FIG. 4 is executed by the CPU 50 of the recording control device 32 executing a lifetime estimation program. It should be noted that this lifetime estimation program is installed in the ROM 52 of the recording control device 32 in advance. The lifetime estimation process illustrated in FIG. 4 is executed, for example, in a case where an execution instruction to perform reading or writing of data from or to the recording tape T of the recording tape cartridge 10 is input by the user via the input unit 60.

In step S10 of FIG. 4, the CPU 50 controls the moving mechanism so that the recording tape cartridge 10 is taken out of the slot 36, and the taken-out recording tape cartridge 10 is loaded into the tape drive 38. In the next step S12, the CPU 50 performs control to the reading unit 40 to read the signal level, the measurement date, and the degree of change recorded on the RFID tag 22 of the recording tape cartridge 10 loaded in step S10. The CPU 50 acquires the signal level, the measurement date, and the degree of change read by the reading unit 40 via the input and output I/Fs 62 and 68. It should be noted that the signal level, the measurement date, and the degree of change acquired in step S12 are hereinafter referred to as a "first signal level", a "first measurement date", and a "first degree of change", respectively, in order to avoid confusion.

In the next step S14, the CPU 50 controls the head 42 to cause the reproducing element 46 to read the servo signal recorded on the servo track of the recording tape T of the recording tape cartridge 10. The CPU 50 acquires the signal level of the servo signal measured by the reproducing element 46 in a case where the servo signal is read under the control of the CPU 50. It should be noted that the signal level acquired in step S14 is hereinafter referred to as a "second signal level" in order to avoid confusion.

In the next step S16, the CPU 50 subtracts the first measurement date acquired in step S12 from a current date, that is, the measurement date of the second signal level and converts a value obtained through the subtraction in units of time to calculate a storage period of the recording tape cartridge 10. Further, the CPU 50 subtracts the first signal level from the second signal level to calculate the amount of change in the signal level. In the embodiment, the CPU 50 divides the calculated amount of change in the signal level by a common logarithm of the calculated storage period to calculate the degree of change in the signal level with the lapse of time. The calculated degree of change in step S16 is hereinafter referred to as a "second degree of change" in order to avoid confusion.

Figure 5:
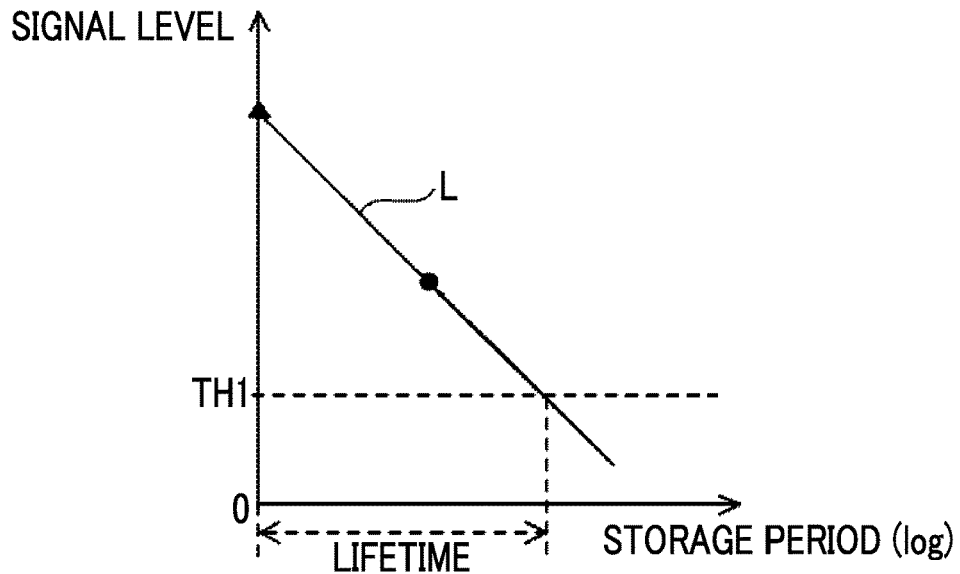
FIG. 5 is a graph illustrating the lifetime estimation process according to the embodiment.

The second degree of change calculated in step S16 corresponds to a slope of a straight line L illustrated in FIG. 5 by way of example. It should be noted that a triangle mark in FIG. 5 indicates the first signal level acquired in step S10, and a circle mark indicates the second signal level acquired in step S14.

In the next step S18, the CPU 50 calculates a storage period in which the signal level is lower than a threshold value TH1 using the first signal level and the second degree of change, and estimates the calculated storage period as the lifetime of the recording tape cartridge 10, as illustrated in FIG. 5. It should be noted that, for example, an upper limit value of a signal level at which the error rate of reading or writing of data from or to the recording tape T included in the recording tape cartridge 10 is equal to or greater than an allowable value can be applied as the threshold value TH1 in this case. Further, this threshold value TH1 may be set by the user.

In the next step S20, the CPU 50 estimates an environmental temperature T2 of the environment in which the recording tape cartridge 10 is stored at a current point in time using the first degree of change and the second degree of change. In the embodiment, the CPU 50 multiplies the environmental temperature T1 by a ratio of the first degree of change to the second degree of change, and estimates the temperature obtained through the multiplication as the environmental temperature T2.

In the next step S22, the CPU 50 determines whether or not the environmental temperature T2 estimated in step S20 is within a predetermined temperature range. In a case where the determination is positive, the process proceeds to step S26, and in a case where the determination is negative, the process proceeds to step S24. It should be noted that a temperature range equal to or higher than a lower limit value of a temperature suitable for storage of the recording tape cartridge 10 determined according to a specification of the recording tape cartridge 10 and lower than an upper limit value thereof (for example, equal to or higher than 15° C. and lower than 25° C.) can be applied as the temperature range in this case.

Figure 6:
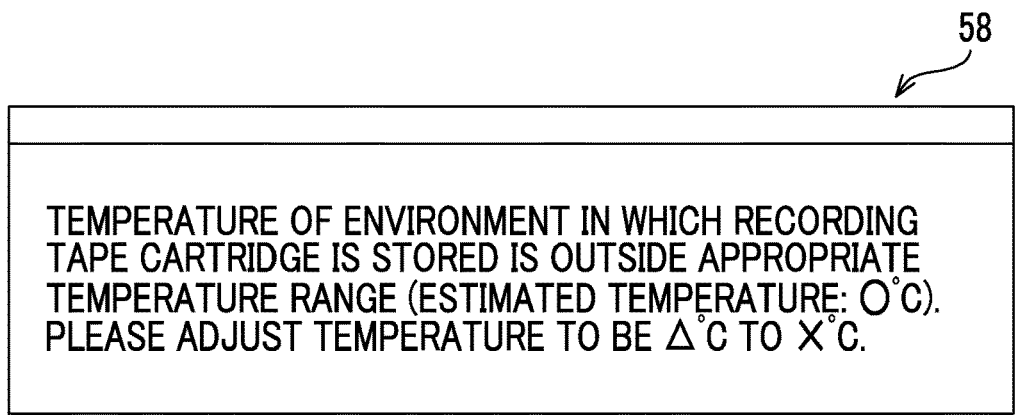
FIG. 6 is a diagram illustrating an example of a first warning display screen according to the embodiment.

In step S24, the CPU 50 displays a first warning display screen for reporting to the user that the environmental temperature T2 is outside the environmental temperature range on the display unit 58. FIG. 6 illustrates an example of the first warning display screen. As illustrated in FIG. 6, a message indicating that the environmental temperature T2 is outside the above temperature range, the estimated environmental temperature T2, and the above temperature range are displayed on the first warning display screen according to the embodiment. In a case where the process of step S24 ends, the process proceeds to step S26.

In step S26, the CPU 50 determines whether or not the remaining period of the lifetime estimated in step S18 is smaller than a predetermined threshold value TH2. In a case where this determination is a negative determination, the process proceeds to step S30, and in a case where the determination is a positive determination, the process proceeds to step S28. It should be noted that, for example, a value designated by the user can be applied as the threshold value TH2 in this case.

Figure 7:
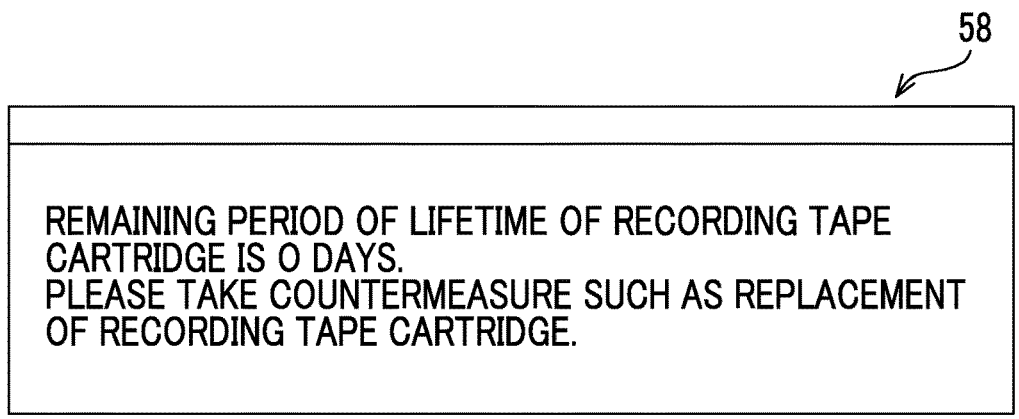
FIG. 7 is a diagram illustrating an example of a second warning display screen according to the embodiment.

In step S28, the CPU 50 displays a second warning display screen for reporting to the user that the remaining period of the lifetime is smaller than the threshold value TH2 on the display unit 58. FIG. 7 illustrates an example of the second warning display screen. As illustrated in FIG. 7, the remaining period of the lifetime and a message for requesting a countermeasure such as replacement of the recording tape cartridge 10 are displayed on the second warning display screen according to the embodiment. In a case where the process of step S28 ends, the process proceeds to step S30.

In step S30, the CPU 50 performs control on the head 42 to position the recording element 44 according to a reading result of the servo signal in step S14. The CPU 50 performs reading or writing of data from or to the recording tape cartridge 10 after the positioning of the recording element 44 ends. In the next step S32, the CPU 50 unloads the recording tape cartridge 10 loaded into the tape drive 38 in step S10 from the tape drive 38. The CPU 50 controls the movement mechanism so that the unloaded recording tape cartridge 10 return to the slot 36. In a case where the process of step S32 ends, the lifetime estimation process ends.

As described above, according to the embodiment, the lifetime of the recording tape cartridge 10 is estimated using the information correlated with the error rate and the measurement date read by the reading unit 40, and information measured in a case where the recording tape cartridge 10 is used and a measurement date. Therefore, it is possible to accurately estimate the lifetime of the recording tape cartridge.

Further, according to the embodiment, the signal level of the servo signal is applied as the information correlated with the error rate. Generally, a wavelength of the servo signal recorded on the servo track of the recording tape T is often relatively long. Since a degree of change in a state of the servo signal having a relatively long wavelength with elapse of time changes relatively largely, the change relatively greatly influences the lifetime of the recording tape cartridge 10. Therefore, according to the embodiment, it is possible to accurately estimate the lifetime of the recording tape cartridge.

It should be noted that in the above embodiment, the case where the first signal level, the first measurement date, and the first degree of change are recorded on the RFID tag 22 has been described, but the present invention is not limited thereto. For example, the first signal level, the first measurement date, and the first degree of change may be recorded in the head portion of the recording tape T or may be recorded in a bar code label attached at a predetermined position on an outer circumferential surface of the case 12.

Further, in the above embodiment, an aspect in which the lifetime of the recording tape cartridge 10 is estimated using the second signal level measured in a case where the recording tape cartridge 10 is used a plurality of times within a predetermined period backward from the current point in time and the second measurement date may be adopted. In this case, an aspect in which the second degree of change is calculated using the second signal level measured a plurality of times and the second measurement date, and the lifetime of the recording tape cartridge 10 is estimated from the calculated second degree of change is illustrated.

Further, in the above embodiment, the case where the signal level in a case where the servo signal recorded on the recording tape T is read is applied as the information correlated with the error rate has been described, but the present invention is not limited thereto. The error rate itself may be applied as the information correlated with the error rate. The error rate in this case can be calculated by the recording control device 32 dividing the number of occurrences of errors of reading or writing of data from or to the recording tape T by times of use of the recording tape cartridge 10.

Further, in the above embodiment, an aspect in which the recording control device 32 stores the first signal level, the first measurement date, and the first degree of change read from the RFID tag 22 in the storage unit 56 in a case where the recording tape cartridge 10 is used may be adopted. In this case, an aspect in which the first signal level, the first measurement date, and the first degree of change are read from the storage unit 56 in a case where the recording tape cartridge 10 is used next time and subsequent times is illustrated.

Further, in the above embodiment, the case where the RFID tag 22 has been applied as a recording medium from which recorded information can be read in a noncontact manner has been described, but the present invention is not limited thereto. For example, an aspect in which a memory card having a wireless communication function is applied as the recording medium from which the recorded information can be read in a noncontact manner may be adopted.

Further, in the above embodiment, the case where the RFID tag using a passive method is applied as the RFID tag 22 has been described, but the present invention is not limited thereto. For example, an aspect in which an RFID tag using a scheme of transmitting radio waves (a so-called active scheme) is applied as the RFID tag 22 may be adopted.

Further, in the above embodiment, various types of processors other than the CPU may execute the lifetime estimation process executed by the CPU executing the software (program). As the processor in this case, a programmable logic device (PLD) of which a circuit configuration can be changed after manufacture such as a field-programmable gate array (FPGA), a dedicated electrical circuit which is a processor having a circuit configuration designed to be dedicated for execution of a specific process such as an application specific integrated circuit (ASIC), or the like is illustrated. Further, the lifetime estimation process may be executed by one of the various processors, or may be executed by a combination of two or more of the same or different types of processors (for example, a combination of a plurality of FPGAs or a CPU and an FPGA). Further, a hardware structure of the various processors is, more specifically, an electrical circuit in which circuit elements such as semiconductor elements are combined.

Further, in the above embodiment, an aspect in which the lifetime estimation program is stored (installed) in the ROM 52 in advance has been described, but the present invention is not limited thereto. The positioning control program may be provided in an aspect in which the lifetime estimation program has been recorded on a recording medium such as a compact disk read only memory (CD-ROM), a digital versatile disk read only memory (DVD-ROM), or a universal serial bus (USB) memory. Further, an aspect in which the lifetime estimation program is downloaded from an external device over a network may be adopted.

EXPLANATION OF REFERENCES

10: recording tape cartridge
12: case
13: pin holding portion
14: opening
15: groove
16: leader pin
16A: annular groove
16B: both end portions
18: door
18A: convex portion
20: reel
22: RFID tag
30: recording system
32: recording control device
34: tape library
36: slot
38: tape drive
40: reading unit
42: head
44: recording element
46: reproducing element
50: CPU
52: ROM
54: RAM
56: storage unit
58: display unit
60: input unit
62, 68: input and output I/F
64: bus
FR: arrow
L: straight line
RH: arrow
T: recording tape
UP: arrow

What is claimed is:

1. A recording control device comprising:
a reading unit that reads a signal level in a case which a servo signal recorded on a magnetic tape was read, the signal level being information correlated with an error rate of reading or writing of data from or to the magnetic tape included in a recording tape cartridge, the information being recorded on a recording medium included in the recording tape cartridge, and a measurement date of the signal level that was recorded on the recording medium; and
an estimation unit that estimates a lifetime of the recording tape cartridge using the signal level and the measurement date read by the reading unit, and another signal level for the servo signal and another measurement date of the another signal level that are measured at the time of using the recording tape cartridge.

2. The recording control device according to claim 1, wherein:
a degree of change with elapse of time in the information in a case where the recording tape cartridge is stored in an environment at a predetermined environmental temperature is further recorded on the recording medium, the reading unit further reads the degree of change, and the estimation unit further estimates an environmental temperature of an environment in which the recording tape cartridge is stored at a current point in time using a degree of change with elapse of time in the information, calculated using the information and the measurement date read by the reading unit and the information measured at the time of using the recording tape cartridge and the measurement date, and the degree of change read by the reading unit.

3. The recording control device according to claim 1, wherein the information measured in a process of manufacturing the recording tape cartridge and a measurement date are recorded on the recording medium.

4. The recording control device according to claim 1, wherein the estimation unit estimates the lifetime of the recording tape cartridge using the information measured at the time of using the recording tape cartridge a plurality of times within a predetermined period backward from a current point in time, and the measurement date.

5. The recording control device according to claim 1, wherein the recording medium is an RFID tag.

6. The recording control device according to claim 1, wherein the estimation unit calculates a degree of change with elapse of time for the signal level, using the signal level and the measurement date of the servo signal that are recorded beforehand, and the another signal level and the another measurement date that are measured at the time of using the recording tape cartridge, and estimates the lifetime of the recording tape cartridge using the calculated degree of change.

7. A recording control method comprising:
reading a signal level in a case which a servo signal recorded on a magnetic tape was read, the signal level being information correlated with an error rate of reading or writing of data from or to the magnetic tape included in a recording tape cartridge recorded on a recording medium included in the recording tape cartridge, and a measurement date of the signal level that was recorded on the recording medium; and
estimating a lifetime of the recording tape cartridge using the read signal level and the read measurement date, and another signal level for the servo signal and another measurement date of the another signal level that are measured at the time of using the recording tape cartridge and a measurement date.

\* \* \* \* \*